(12) United States Patent
Kwon

(10) Patent No.: US 12,291,463 B2
(45) Date of Patent: May 6, 2025

(54) WATER PURIFYING FILTER COUPLED TO MOUTH OF BEVERAGE CONTAINER

(71) Applicant: REALWATER CO., LTD., Seoul (KR)

(72) Inventor: Hyeok Jae Kwon, Seoul (KR)

(73) Assignee: REALWATER CO., LTD., Seoul (KR)

( * ) Notice: Subject to any disclaimer, the term of this patent is extended or adjusted under 35 U.S.C. 154(b) by 366 days.

(21) Appl. No.: 17/918,018

(22) PCT Filed: Jul. 24, 2020

(86) PCT No.: PCT/KR2020/009755
§ 371 (c)(1),
(2) Date: Oct. 10, 2022

(87) PCT Pub. No.: WO2021/221231
PCT Pub. Date: Nov. 4, 2021

(65) Prior Publication Data
US 2023/0133952 A1    May 4, 2023

(30) Foreign Application Priority Data
Apr. 28, 2020  (KR) .......... 10-2020-0051189

(51) Int. Cl.
*C02F 1/00* (2023.01)
*B65D 51/24* (2006.01)

(52) U.S. Cl.
CPC ............ *C02F 1/002* (2013.01); *B65D 51/24* (2013.01)

(58) Field of Classification Search
CPC .......... C02F 1/002; C02F 1/003; C02F 1/281; C02F 1/283; C02F 1/42; C02F 2201/003;
(Continued)

(56) References Cited

U.S. PATENT DOCUMENTS 5,840,185 A * 11/1998 Hughes .................. C02F 1/003
                                                    210/477
5,928,512 A *  7/1999 Hatch .................... C02F 1/003
                                                    210/429
(Continued)

FOREIGN PATENT DOCUMENTS

JP   H08252486    10/1996
KR   20110024790   3/2011
(Continued)

OTHER PUBLICATIONS

English Translation of KR_101264244_B1 from PE2E search database. (Year: 2013).*

*Primary Examiner* — Terry K Cecil
(74) *Attorney, Agent, or Firm* — IPLA P.A.

(57) ABSTRACT

A water purifying filter coupled to a mouth (20) of a beverage container (10) in which water or drinking water is stored, includes: a tubular housing (100) having a first screw (110) for coupling to a screw part (21) provided at the mouth of the beverage container that is formed on an inside of a lower end portion thereof and a second screw (120) for coupling a cap (30) of the beverage container that is formed on an outside of an upper end portion thereof; a first filter (200) disposed inside the housing to primarily purify the drinking water discharged from the beverage container; a second filter (300) disposed at an upper end portion of the first filter to secondarily purify the drinking water primarily purified through the first filter; and a cover unit (400) inserted into a lower end portion of the housing.

3 Claims, 7 Drawing Sheets

(58) Field of Classification Search
CPC ............ C02F 2201/006; C02F 2307/02; C02F 2307/04; B65D 51/24; B01D 35/30; B01D 35/02; A45F 2003/163
See application file for complete search history.

(56) References Cited

U.S. PATENT DOCUMENTS

2009/0039006 A1* 2/2009 Chung .................... C02F 1/002
  210/226
2010/0219151 A1* 9/2010 Risheq .................... C02F 1/003
  210/348

FOREIGN PATENT DOCUMENTS

| KR | 20130013033 | | 2/2013 | |
| KR | 101264244 B1 | * | 5/2013 | ....... A45F 2003/163 |

\* cited by examiner

WATER PURIFYING FILTER COUPLED TO MOUTH OF BEVERAGE CONTAINER

BACKGROUND

The present invention relates to a water purifying filter coupled to a mouth of a beverage container and, more specifically, to a water purifying filter coupled to a mouth of a beverage container, which is coupled to the mouth of the beverage container so as to enable drinking water accommodated in the beverage container to be filtered through a filter and be consumed, and which enables a cap of the beverage container to be re-mounted after use.

There are many products that can conveniently store beverages such as water, coffee, and carbonated beverages, and have a cap installed to prevent the stored beverage from spilling out during use. These products mainly have a structure that opens the cap and tilts the beverage container to drink or insert a straw for convenient use.

The conventional beverage container basically prevents contamination due to dust or foreign substances from the outside. However, there is a problem in that it does not have a filtering function for microplastics generated in the beverage container made of synthetic resin (PET) itself.

In addition, as well-being or healing has emerged as an important social issue in recent years, the purified water is provided and consumed rather than tap water. Accordingly, these bottled waters inevitably contain additives to prevent spoilage in order to extend the shelf life. In addition, there is a problem in that the contamination thereof cannot be avoided because it is simply preserved by the stopper in the process of re-drinking after drinking only a portion of the drinking water.

Accordingly, Korean Utility Model Registration No. 20-0481586 discloses a portable container in which filter exchange is easy. However, since such technology requires a dedicated beverage container suitable for a filter, it cannot be applied to the existing beverage container.

SUMMARY OF THE INVENTION

Accordingly, the present invention has been made in an effort to solve the problems and an object of the present invention is to provide a water purifying filter coupled to a mouth of a beverage container in that the drinking water accommodated in the beverage container is filtered through a filter for drinking and the cap of the beverage container can be re-mounted after use.

Another object of the present invention is to provide a water purifying filter coupled to a mouth of a beverage container in that it is possible to prevent the drinking water inside the beverage container from leaking to the outside by the water leakage prevention protrusion provided in the housing and can correspond to the various sizes of the mouth of the conventional beverage container by forming the inclined surface on the water leakage prevention protrusion.

Another object of the present invention is to provide a water purifying filter coupled to a mouth of a beverage container in that the filtering unit is formed in the second filter to filter foreign substances contained in the drinking water and simultaneously the water purification effect is implemented, thereby performing the water treatment function.

The problems to be solved by the present invention are not limited to the above-mentioned objects, and other objects not mentioned herein will be clearly understood by those skilled in the art from the following description.

In order to achieve the first object, the present invention provides a water purifying filter coupled to a mouth (20) of a beverage container (10) in which water or drinking water is stored, including: a tubular housing (100) having a first screw (110) for coupling to a screw part (21) provided at the mouth of the beverage container that is formed on an inside of a lower end portion thereof and a second screw (120) for coupling a cap (30) of the beverage container that is formed on an outside of an upper end portion thereof; a first filter (200) disposed inside the housing to primarily purify the drinking water discharged from the beverage container; a second filter (300) disposed at an upper end portion of the first filter to secondarily purify the drinking water first purified through the first filter; and a cover unit (400) inserted into a lower end portion of the housing to allow the first filter to be embedded therein and having an aperture (410) formed on the lower surface thereof to allow the drinking water discharged from the beverage container to pass through.

At this time, the housing (100) includes a water leakage prevention protrusion (130) for inserting an upper end portion of the mouth of the beverage container therein disposed at an upper end portion of the first screw to prevent the drinking water from leaking to the outside, and the water leakage prevention protrusion (130) includes an outer frame (131) extending upwardly from the upper end portion of the first screw; a sealing frame (132) bent inwardly from an upper end portion of the outer frame and in close contact with an upper surface of the mouth; and an inner frame (133) that is bent downward from one end of the sealing frame and is in contact with an inner circumferential surface of the mouth.

In addition, the water leakage prevention protrusion (130) is formed to have an inclined surface (134) inclined in an outward direction from the inner frame toward the sealing frame.

In the meantime, the second filter further includes an upper fixing plate (310) coupled to an upper fitting groove (140) disposed on an inner wall of the housing and having an upper filter member (311), which is formed at a lower end portion thereof; a lower fixing plate (320) coupled to a lower fitting groove (150) spaced apart from a lower portion of the upper fitting groove and having a lower filter member (321), which is formed at an upper end portion thereof; and a filtering unit (330) filled between the upper fixing plate and the lower fixing plate.

At this time, the upper fixing plate and the lower fixing plate include lattice-shaped through holes (312 and 322) and the filtering unit is filled with any one of activated carbon, zeolite, ion-exchange resin, and ceramic balls having a diameter larger than that of the through hole.

In the meantime, the aperture of the cover unit is disposed along an outer periphery of a blocking plate (420) provided in a central portion of the lower surface of the cover unit so that the drinking water discharged from the beverage container is introduced from the outer direction of the first filter.

At this time, the blocking plate further includes a protruding member (421) formed on an upper surface thereof to be inserted into a lower end portion of the first filter.

In the meantime, the housing further includes a recovery hole (160), which is formed on one side of the inner circumferential surface of the upper end portion thereof and a recovery tube (170), which is connected to the recovery hole (160) to discharge the residual drinking water to the outside of the first filter (200).

As described above, according to the present invention, the drinking water accommodated in the beverage container is filtered through a filter for drinking and the cap of the beverage container can be re-mounted after use.

In addition, according to the present invention, it is possible to prevent the drinking water inside the beverage container from leaking to the outside by the water leakage prevention protrusion provided in the housing and can correspond to the various sizes of the mouth of the conventional beverage container by forming the inclined surface on the water leakage prevention protrusion.

In addition, according to the present invention, the filtering unit is formed in the second filter to filter foreign substances contained in the drinking water and simultaneously the water purification effect is implemented, thereby performing the water treatment function.

The effects of the present invention are not limited to the above-mentioned effects, and other effects not mentioned herein will be clearly understood by those skilled in the art from the following description.

BRIEF DESCRIPTION OF DRAWINGS

The above and other objects, features and advantages of the present invention will be more apparent from the following detailed description taken in conjunction with the accompanying drawings, in which.

REFERENCE NUMERALS

Figure 1:
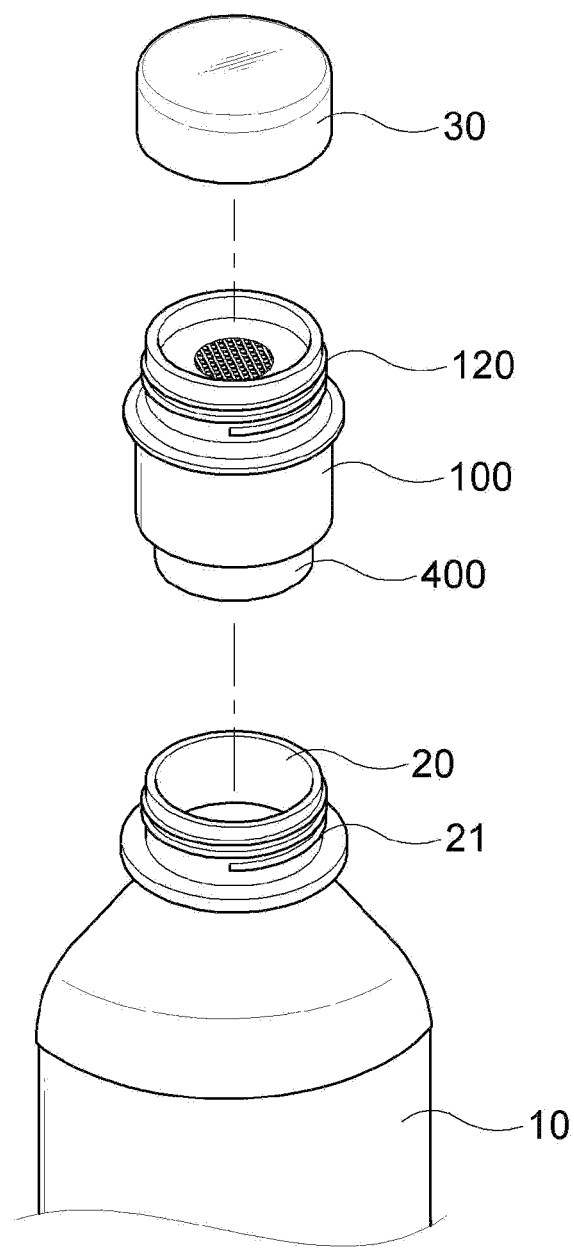
FIG. 1 is an exemplary view of a water purifying filter coupled to a mouth of a beverage container according to a preferred embodiment of the present invention.

| | | |
|---|---|---|
| 10: Beverage container | 20: Mouth | 21: Screw part |
| 30: Cap | 100: Housing | 110: First screw |
| 120: Second screw | 130: Water leakage prevention protrusion | |
| 131: Outer frame | 132: Sealing frame | |
| 133: Inner Frame | 134: Inclined surface | |
| 135: Sealing member | 140: Upper fitting groove | |
| 150: Lower fitting groove | 160: Recovery hole | |
| 170: Recovery tube | 200: First filter | |
| 300: Second filter | 310: Upper fixing plate | |
| 311: Upper filter member | 312: Through hole | |
| 320: Lower fixing plate | 321: Lower filter member | |
| 322: Through hole | 330: Filtering unit | |
| 400: Cover unit | 410: Aperture | |
| 420: Blocking plate | 421: Protruding member | |

DETAILED DESCRIPTION OF THE INVENTION

Since the present invention may be modified in various ways and may have various embodiments, specific embodiments are illustrated in the drawings and described in detail.

However, it should be understood that the present invention is not limited to the specific embodiments, but includes all modifications, equivalents and substitutes included in the spirit and technical scope of the present invention. In describing each drawing, similar reference numerals are used for similar components.

When it is mentioned to be "connected or installed" to the other component, a certain component may be connected or linked to the other component. However, it will be understood that there may be some other components between them. On the other hand, when an element is referred to as "directly connected or installed" to another element, it will be understood that there are no other elements between them.

The terms used in this application do not intend to limit this invention, but are used only to explain specific implementation examples. The singular expression includes plural expressions unless it is apparently different in the context. The terms such as "include", "equipped" or "have" in this application intend to designate that the feature, number, stage, movement, component, part or the combination described in the specification. Therefore, it will be understood that the existence or the additional possibility of one or more than one different features, numbers, stages, actions, components, parts and the combination is not excluded in advance.

The desirable implementation examples in accordance with this invention are explained in detail in reference to the drawings attached below. But, the same reference numbers are given to the same or corresponding components regardless of drawing codes and repeated explanations will be omitted.

Hereinafter, embodiments of the present invention will be described in detail with reference to the accompanying drawings.

Figure 2:
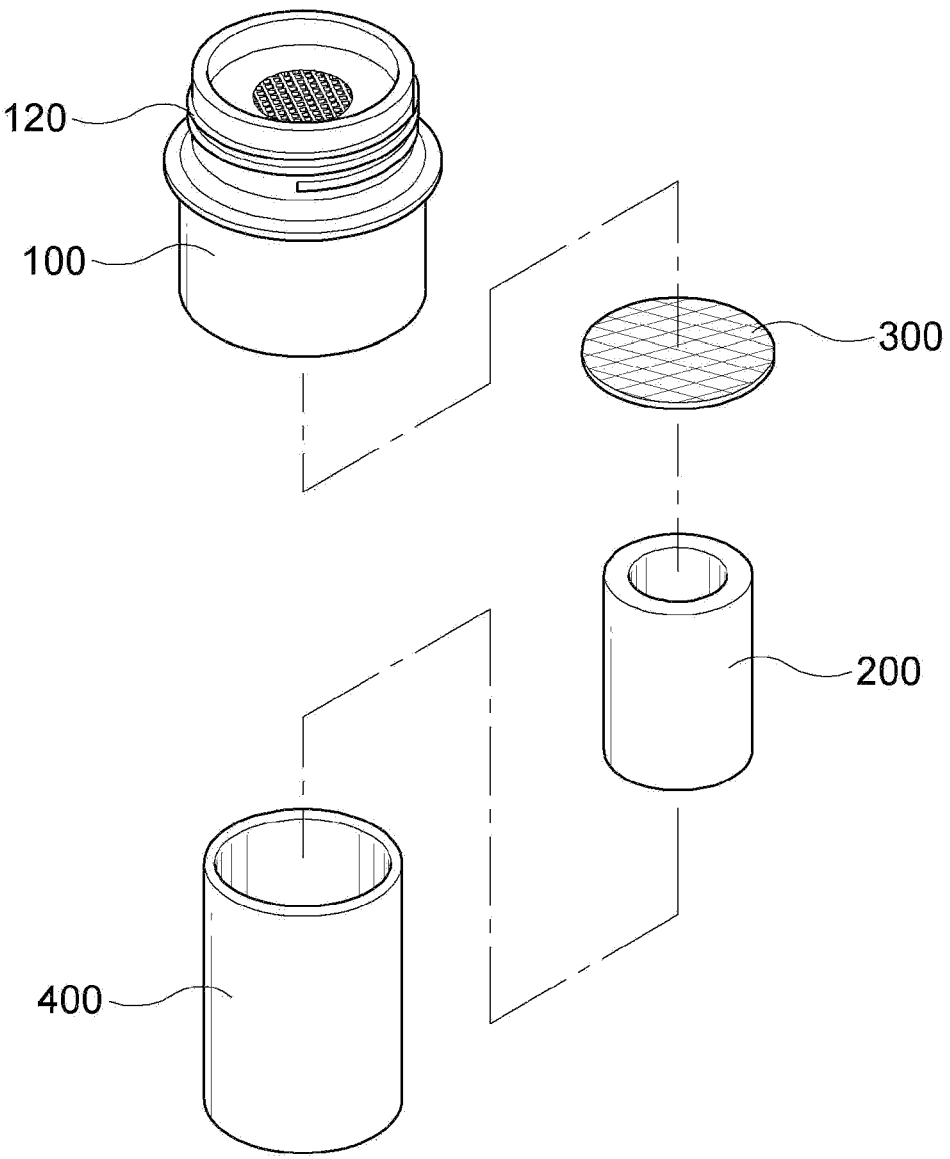
FIG. 2 is an exemplary view illustrating an exploded state of a water purifying filter coupled to a mouth of a beverage container according to a preferred embodiment of the present invention.
Figure 3:
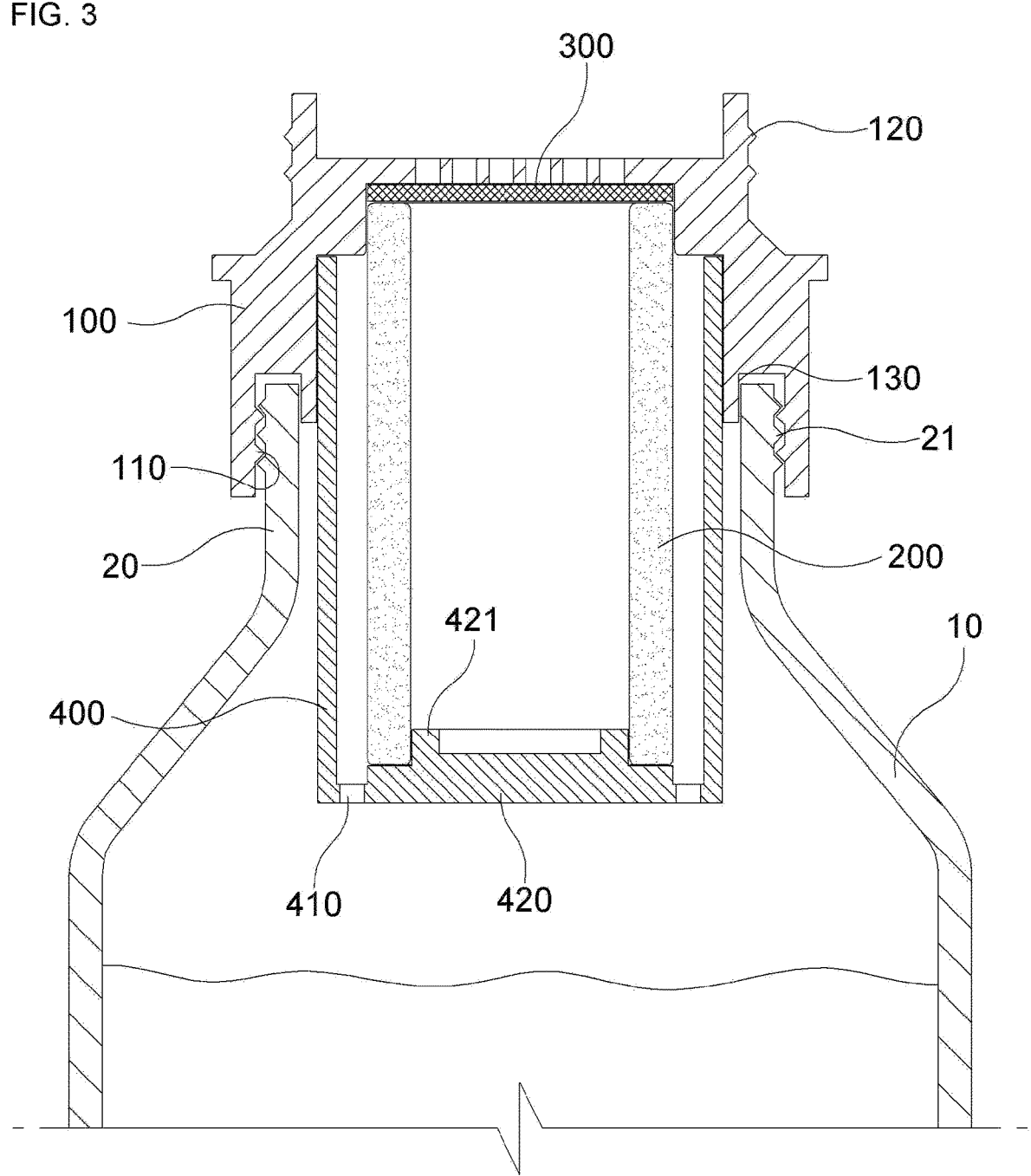
FIG. 3 is an exemplary view illustrating a schematic cross-section of a water purifying filter coupled to a mouth of a beverage container according to a preferred embodiment of the present invention.
Figure 4:
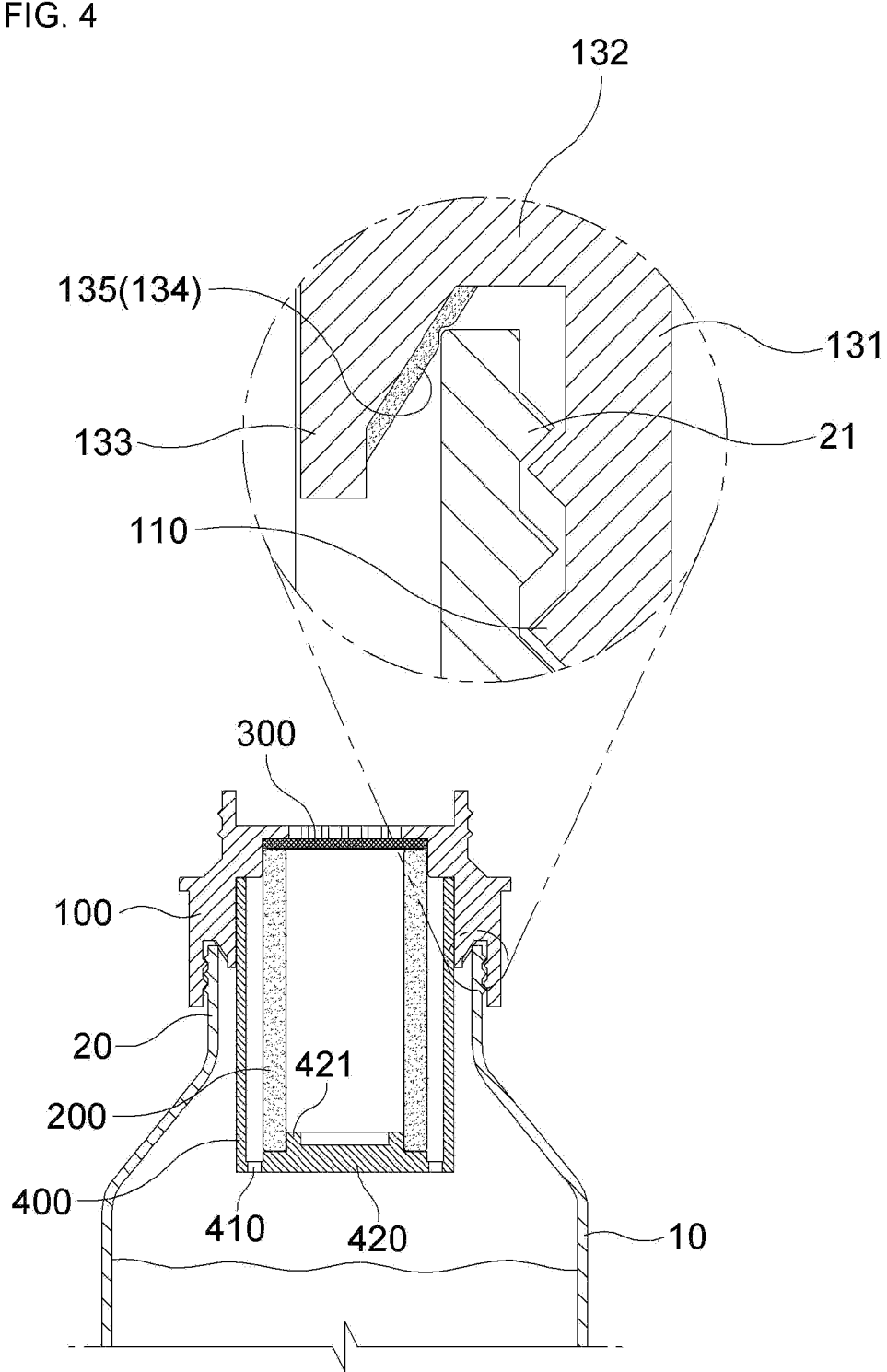
FIG. 4 is a schematic cross-sectional view of a water leakage prevention protrusion according to an embodiment of the present invention.
Figure 5:
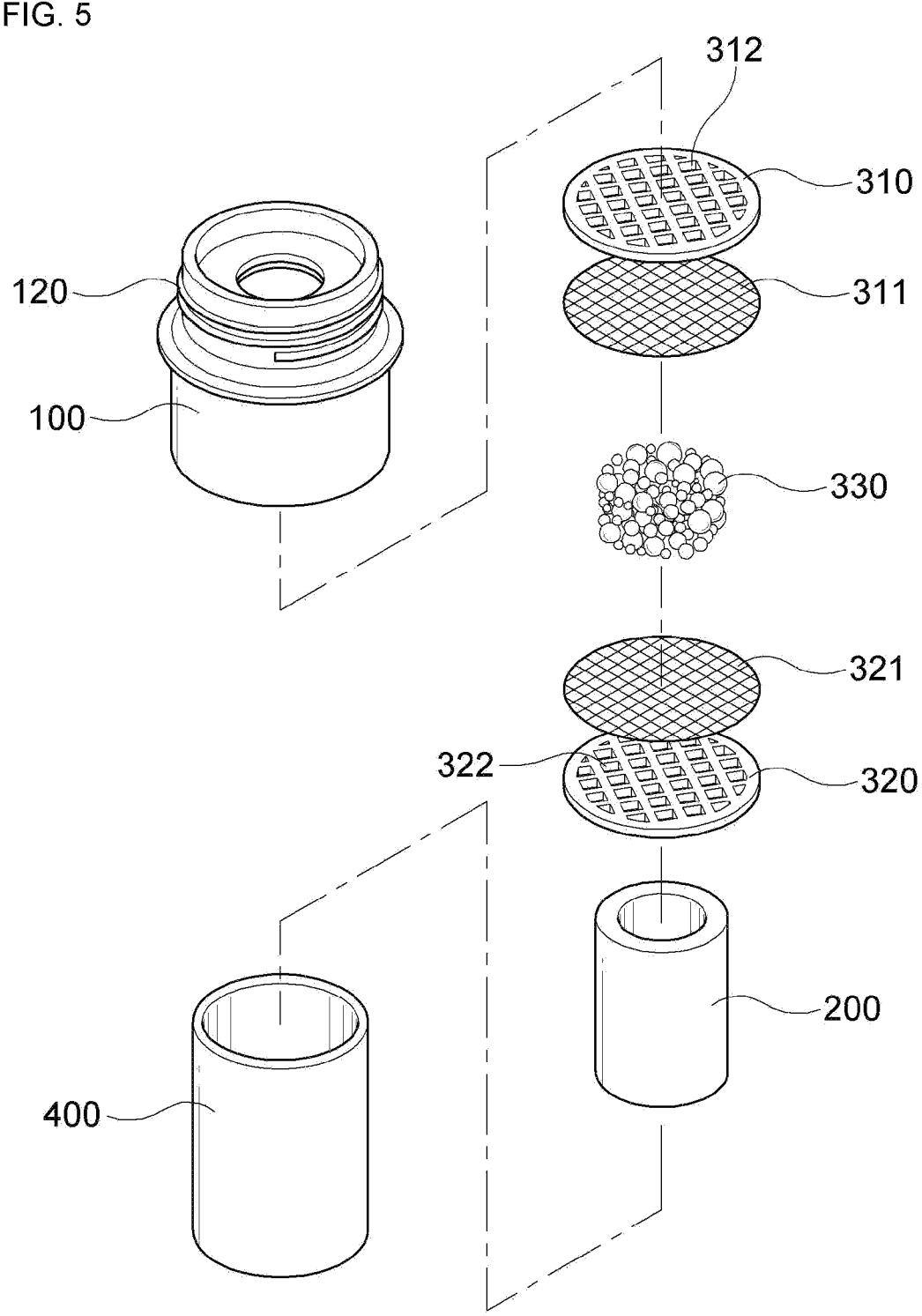
FIG. 5 is an exemplary view illustrating an exploded state of a water purifying filter coupled to a mouth of a beverage container according to another embodiment of the present invention.
Figure 6:
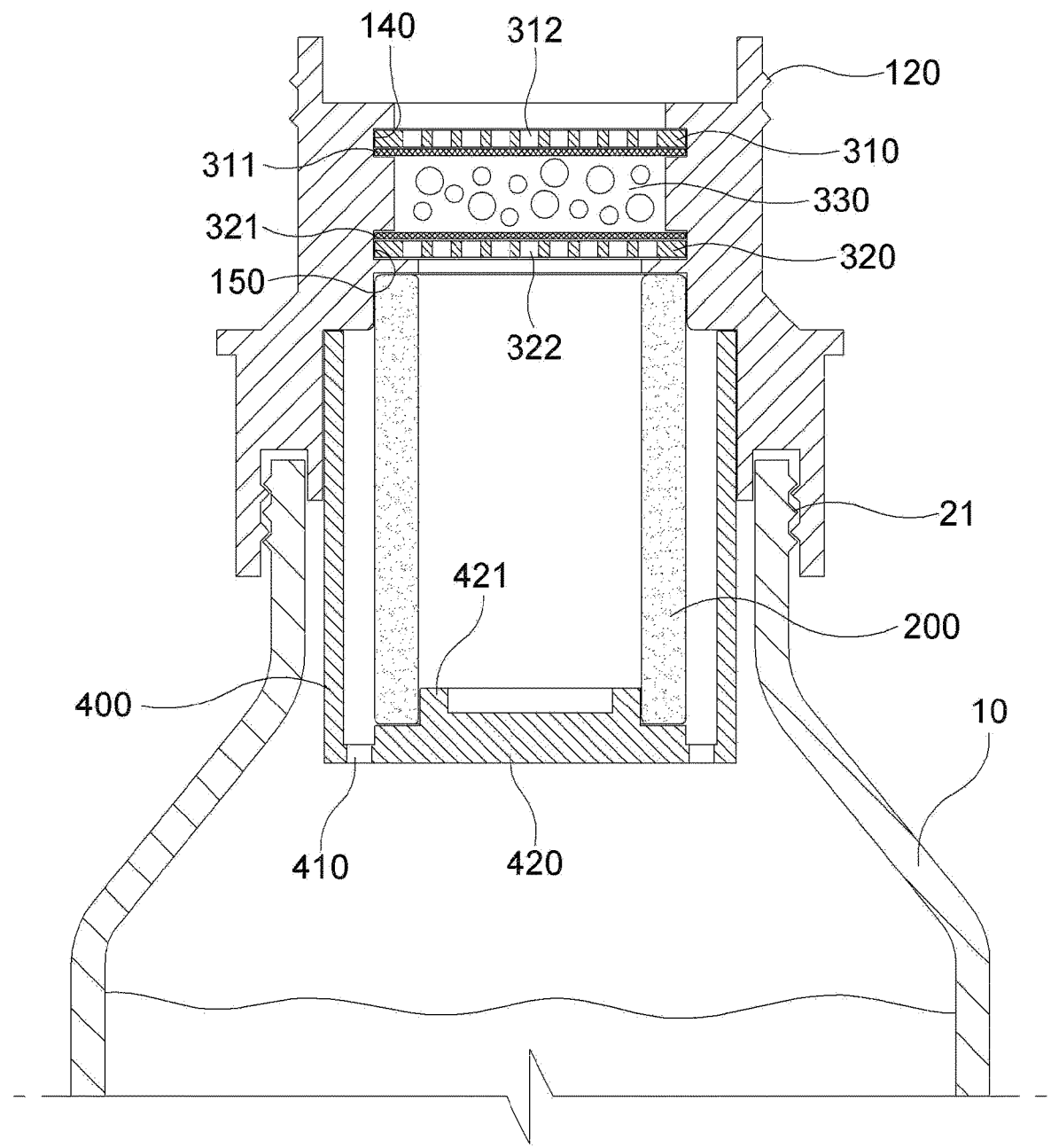
FIG. 6 is an exemplary view illustrating a schematic cross-section of a water purifying filter coupled to a mouth of a beverage container according to another embodiment of the present invention.
Figure 7:
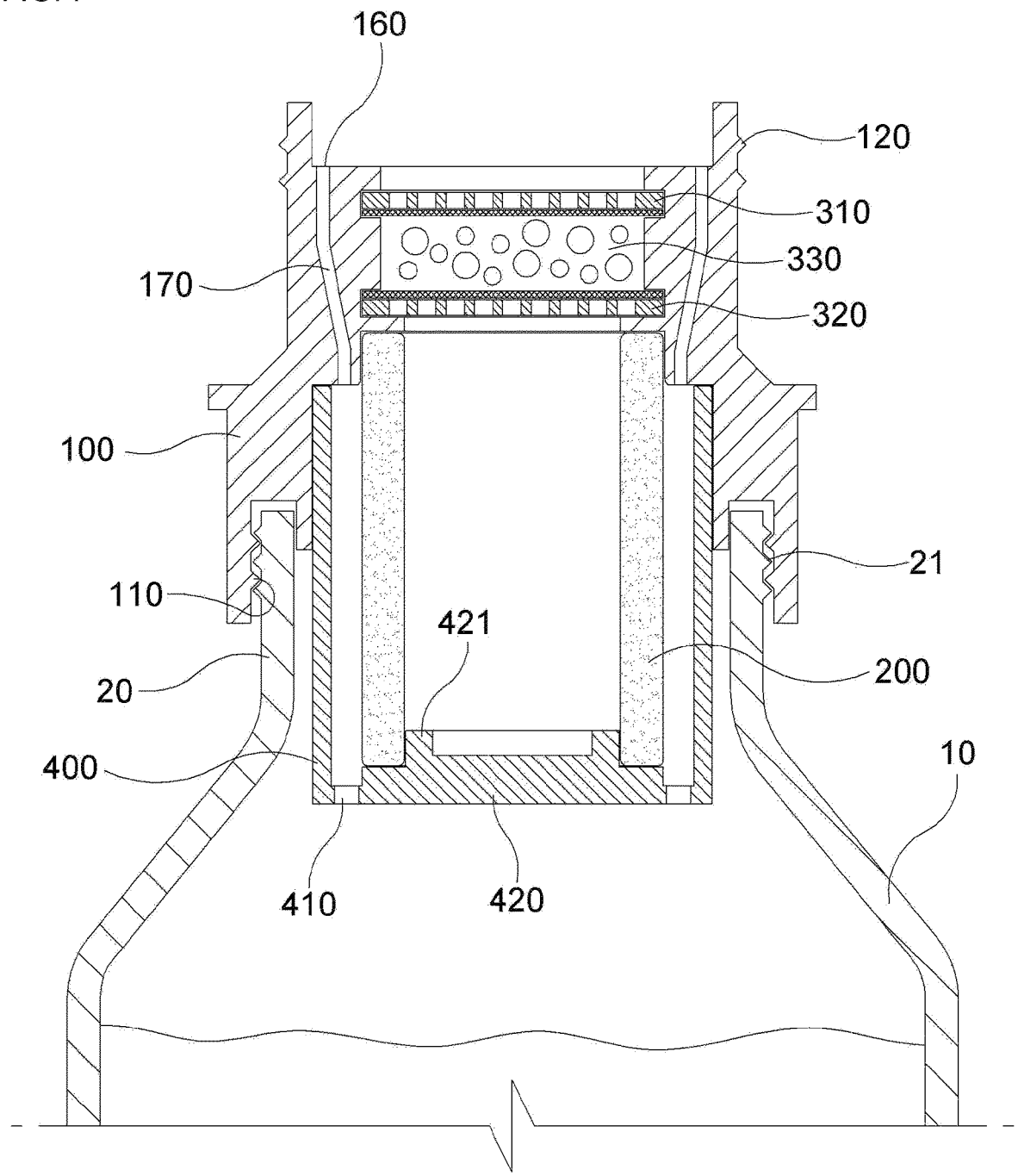
FIG. 7 is an exemplary view illustrating a schematic cross-section of a cover unit according to another embodiment of the present invention.

FIG. 1 is an exemplary view of a water purifying filter coupled to a mouth of a beverage container according to a preferred embodiment of the present invention; FIG. 2 is an exemplary view illustrating an exploded state of a water purifying filter coupled to a mouth of a beverage container according to a preferred embodiment of the present invention; FIG. 3 is an exemplary view illustrating a schematic cross-section of a water purifying filter coupled to a mouth of a beverage container according to a preferred embodiment of the present invention; FIG. 4 is a schematic cross-sectional view of a water leakage prevention protrusion according to an embodiment of the present invention; FIG. 5 is an exemplary view illustrating an exploded state of a water purifying filter coupled to a mouth of a beverage container according to another embodiment of the present invention; FIG. 6 is an exemplary view illustrating a schematic cross-section of a water purifying filter coupled to a mouth of a beverage container according to another embodiment of the present invention; and FIG. 7 is an exemplary view illustrating a schematic cross-section of a cover unit according to another embodiment of the present invention.

As shown in FIGS. 1 to 7, according to a preferred embodiment of the present invention, the water purifying filter coupled to the mouth of the beverage container, which is, a beverage container mouth coupling type water filter, which is coupled to a mouth (20) of a beverage container (10) in which water or drinking water is stored, is largely composed of a housing (100), a first filter (200), a second filter (300), and a cover unit (400).

As shown in FIGS. 1 to 3, the housing (100) of a tubular shape includes a first screw (110) for coupling to a screw part (21) provided at the mouth (20) of the beverage container (10) that is formed on an inside of a lower end portion thereof and a second screw (120) for coupling a cap (30) of the beverage container (10) that is formed on an outside of an upper end portion thereof;

In this case, the housing (100) may be formed of a synthetic resin material harmless to the human body. Preferably, it may be divided into an upper portion and a lower portion by a flange (not shown) formed in a central portion and the upper portion of the housing may be narrower than the lower portion thereof.

In addition, preferably, the housing may have an intake port (not shown) having a diameter equal to or smaller than the inner diameter of the first filter on the upper end portion thereof, which will be described later, and the water intake port may be formed in a cylindrical shape or a lattice shape.

In the meantime, the first filter (200) having a tubular shape is disposed inside the housing (100) to primarily purify the drinking water discharged from the beverage container (10).

In this case, the first filter (200) may be made of any one selected from the group consisting of a fiber type, a bubble type, and a film type, and the drinking water is filtered while being passed in an inward direction thereof from the outside direction thereof.

The first filter (200) serves to filter components harmful to the human body, such as the microplastic discharged from the beverage container.

The second filter (300) is disposed at an upper end portion of the first filter (200) to secondarily purify the drinking water primarily purified through the first filter (200).

In this case, the second filter (300) may be formed by overlapping a filter made of a non-woven fabric, and preferably, a diameter of the second filter (300) may be larger than an inner diameter of the first filter (200).

In the meantime, the cover unit (400) is inserted into a lower end portion of the housing (100) to allow the first filter (200) to be embedded therein. In addition, the cover unit (400) is provided with an aperture (410) formed on the lower surface thereof to allow the drinking water, which is discharged from the beverage container (10) to pass through.

In this case, as shown in FIG. 3, the aperture (410) of the cover unit (400) is disposed along an outer periphery of a blocking plate (420) provided in a central portion of the lower surface of the cover unit (400) so that the drinking water discharged from the beverage container (10) is introduced from the outer direction of the first filter (200).

In addition, the blocking plate further includes a protruding member (421) formed on an upper surface thereof to be inserted into a lower end portion of the first filter.

In the meantime, as shown in FIG. 4, the housing (100) according to another embodiment of the present invention includes a water leakage prevention protrusion (130) for inserting an upper end portion of the mouth (20) of the beverage container (10) therein, which is disposed at an upper end portion of the first screw (110), to prevent the drinking water from leaking to the outside. In this case, the water leakage prevention protrusion (130) includes:

an outer frame (131) extending upwardly from the upper end portion of the first screw;

a sealing frame (132) bent inwardly from an upper end portion of the outer frame (131) and in close contact with an upper surface of the mouth (20); and an inner frame (133) that is bent downward from one end of the sealing frame (132) and is in contact with an inner circumferential surface of the mouth (20).

That is, the outer frame (131), the sealing frame (132), and the inner frame (133) are formed in a case shape having an opened lower portion, so that the upper end portion of the mouth (20) of the beverage container (10) is inserted therein.

In this case, the water leakage prevention protrusion (130) is formed to have an inclined surface (134) inclined in an outward direction from the inner frame toward the sealing frame.

The inclined surface (134) of the leakage prevention protrusion (130) may correspond to the mouths (20) having various sizes of the beverage container and may further include a sealing member (135) at an outer side of the inclined surface (134).

In this case, the sealing member (134) may be formed of a soft rubber or a silicone material harmless to the human body and the portion, which is in contact with the mouth (20), may be more firmly pressed to prevent leakage.

In the meantime, as shown in FIGS. 5 to 6, the second filter (300) according to another embodiment of the present invention further includes:

an upper fixing plate (310) coupled to an upper fitting groove (140) disposed on an inner wall of the housing and having an upper filter member (311), which is formed at a lower end portion thereof;

a lower fixing plate (320) coupled to a lower fitting groove (150), which is spaced apart from a lower portion of the upper fitting groove (140), and having a lower filter member (321), which is formed at an upper end portion thereof; and a filtering unit (330) which is filled between the upper fixing plate (310) and the lower fixing plate (320).

In this case, the upper fixing plate (310) and the lower fixing plate (320) include lattice-shaped through holes (312 and 322) and the filtering unit (330) is filled with any one of activated carbon, zeolite, ion-exchange resin, and ceramic balls having a diameter larger than that of the through hole.

The filtering unit (330) serves to filter a preservative component, a microorganism, a virus, or the like included in the drinking water, and secondarily filters the drinking water filtered by the first filter (200).

In the meantime, as shown in FIG. 7, the housing (100) according to another embodiment of the present invention further includes a recovery hole (160), which is formed on one side of the inner circumferential surface of the upper end portion thereof, and a recovery tube (170) which is connected to the recovery hole (160) to discharge the residual drinking water to the outside of the first filter (200).

That is, the recovery hole (160) and the recovery tube (170) serve to allow the residual drinking water left in the process of water intake by the user to be returned to the inside of the beverage container.

In other words, the drinking water filtered by the first filter (200) and the second filter (300), which is remained at the upper end portion of the housing (100), may be prevented from being contaminated, and it is returned to the inside of the beverage container (10) so that it can be filtered.

As described above, according to the present invention, the drinking water accommodated in the beverage container is filtered through a filter for drinking and the cap of the beverage container can be re-mounted after use.

In addition, according to the present invention, it is possible to prevent the drinking water inside the beverage container from leaking to the outside by the water leakage prevention protrusion provided in the housing and can correspond to the various sizes of the mouth of the conventional beverage container by forming the inclined surface on the water leakage prevention protrusion.

In addition, according to the present invention, the filtering unit is formed in the second filter to filter foreign substances contained in the drinking water and simultaneously the water purification effect is implemented, thereby performing the water treatment function.

The effects of the present invention are not limited to the above-mentioned effects, and other effects not mentioned herein will be clearly understood by those skilled in the art from the following description.

As described above, the configuration and operation of the system for correcting posture and method using the smart bag according to the embodiment of the present invention can be made. While the description of the present invention has been described with reference to specific embodiments, but various modifications are provided without deviating the scope of the present invention.

Although the present invention has been described by way of limited embodiments and drawings, the present invention is not limited by this and various modifications and variations can be made by those skilled in the art to which the present invention pertains. Those of ordinary skill in the art related to this embodiment will understand that it may be implemented in a modified form without departing from the essential characteristics of the above-described substrate.

Therefore, the disclosure methods should be considered from an explanatory point of view rather than a restrictive point of view. The scope of the present invention is shown in the claims rather than the foregoing description and all differences within the equivalent range should be interpreted as being included in the present invention.

The invention claimed is:

1. A water purifying filter coupled to a mouth (20) of a beverage container (10) in which water or drinking water is stored, comprising:
   a tubular housing (100) having a first screw (110) for coupling to a screw part (21) provided at the mouth of the beverage container that is formed on an inside of a lower end portion thereof, a second screw (120) for coupling a cap (30) of the beverage container that is formed on an outside of an upper end portion thereof, and an inclined surface inclined upward in an outward direction at a position correspond to an inner edge of the mouth of the beverage container, so that one side of an upper end of the mouth of the beverage container is supported on the inclined surface;
   a first filter (200) disposed in a longitudinal direction of the housing inside the housing to primarily purify the drinking water discharged from the beverage container;
   a second filter (300) disposed at an upper end portion of the first filter and having one side of a lower surface thereof supported by the first filter to secondarily purify the drinking water primarily purified through the first filter; and
   a cover unit (400) inserted into the lower end portion of the housing to allow the first filter to be embedded therein and having an aperture (410) formed on a lower surface thereof to allow the drinking water discharged from the beverage container to pass through,
   wherein the housing (100) includes a water leakage prevention protrusion (130) for inserting an upper end portion of the mouth of the beverage container therein which is disposed at an upper end portion of the first screw to prevent the drinking water from leaking to the outside, the water leakage prevention protrusion (130) including:
   an outer frame (131) extending upwardly from the upper end portion of the first screw;
   a sealing frame (132) bent inwardly from an upper end portion of the outer frame and in close contact with an upper surface of the mouth; and
   an inner frame (133) that is bent downward from one end of the sealing frame and is in contact with an inner circumferential surface of the mouth,
   wherein the water leakage prevention protrusion (130) is formed to have the inclined surface (134) inclined in an outward direction from the inner frame toward the sealing frame.

2. The water purifying filter according to claim 1, wherein the aperture (410) of the cover unit is disposed along an outer periphery of a blocking plate (420) provided in a central portion of the lower surface of the cover unit so that the drinking water discharged from the beverage container is introduced from the outer direction of the first filter.

3. The water purifying filter according to claim 2, wherein the blocking plate further includes a protruding member (421) formed on an upper surface thereof to be inserted into a lower end portion of the first filter.

* * * * *